Oct. 11, 1932.     H. C. LAGERBLADE     1,882,151
METHOD OF MAKING A GOLF SHAFT
Filed Nov. 3, 1930
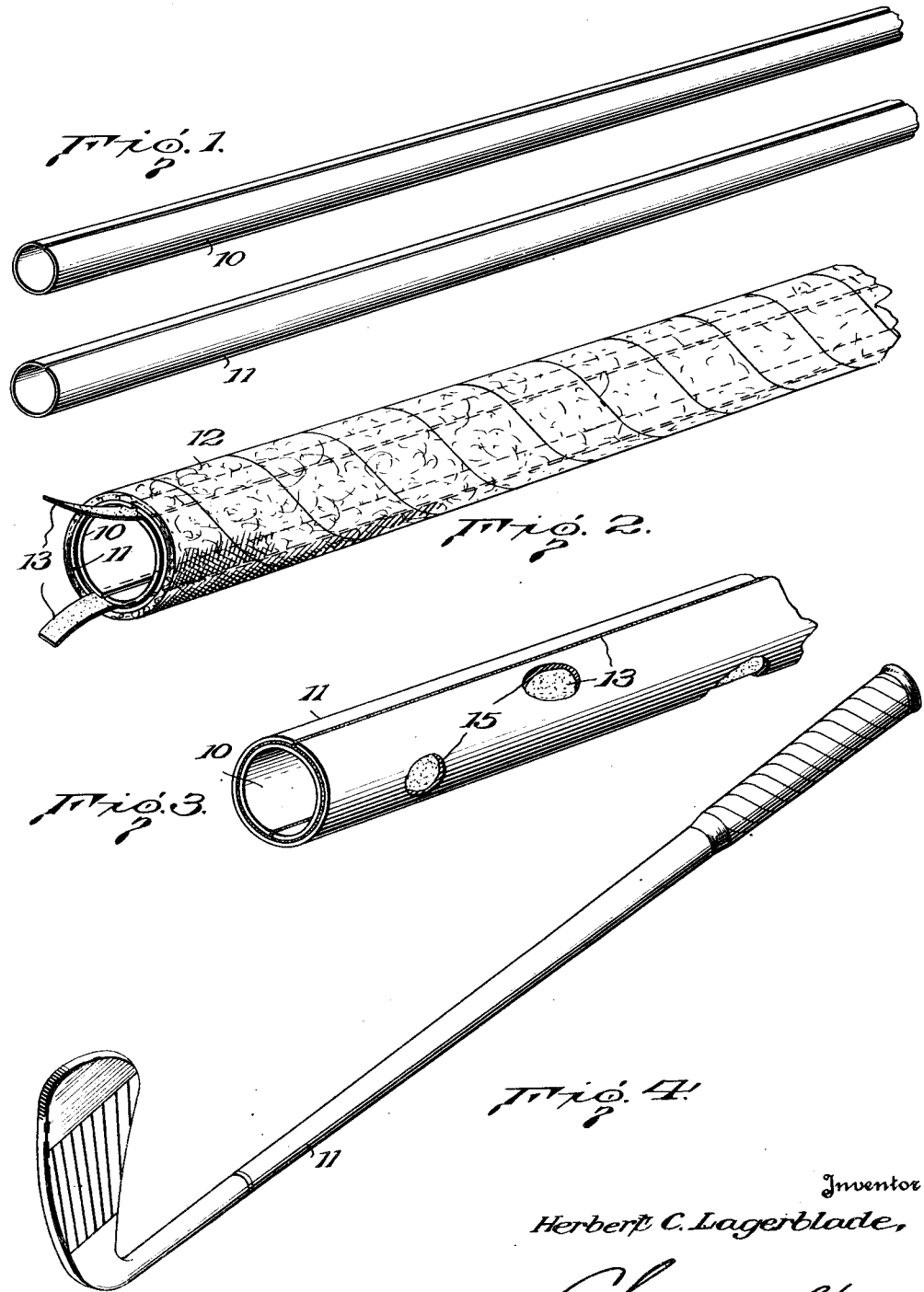
Inventor
Herbert C. Lagerblade,
By
His Attorneys Patented Oct. 11, 1932

1,882,151

UNITED STATES PATENT OFFICE

HERBERT C. LAGERBLADE, OF BRISTOL, CONNECTICUT, ASSIGNOR TO THE HORTON MANUFACTURING COMPANY, OF BRISTOL, CONNECTICUT, A CORPORATION OF CONNECTICUT

METHOD OF MAKING A GOLF SHAFT

Application filed November 3, 1930. Serial No. 493,088.

This invention relates to an improved method of producing tubular metallic shafts, or similar articles, and especially to a method of producing tubular metallic shafts designed to withstand severe and repeated bending and twisting strains, and which, when distorted, will return to the original form, when the strain to which they are subjected is removed. More particularly, the invention relates to improved tubular metallic shafts for use as shafts of golf clubs, and the method of making such shafts.

The shaft of a golf club is subjected to repeated bending and twisting strains that are often severe in nature, and as a consequence the shaft, to be successful, must be so made that it will withstand such strains without failing at any point or losing its resilient and flexible characteristics. In manufacturing tubular metallic shafts from sheet metal, considerable difficulty has been experienced in forming the seam by which the edges of the metal blank are united to form the tubular article. This seam must be so formed that it will not destroy the resilience or flexibility of the finished shaft and it must be so formed as to be substantially as resilient and flexible as the body of the tube. In some instances, in the prior art, a reinforcing strip has been used in the seam, but the present invention contemplates a tubular shaft made from sheet metal in such fashion that the reinforcing strip heretofore used, may be dispensed with. At the same time, the resulting shaft will not only be strong enough to withstand the repeated flexing, but it will also be perfectly balanced and possess the desired uniform resiliency and flexibility.

A further object is to provide a method of manufacturing seamed, metallic tubular shafts, which will enable the manufacture of such articles on a commercial scale at a comparatively low cost, while producing an article which has the necessary strength and the required resiliency and flexibility.

The foregoing objects are accomplished, in one instance, by the instrumentalities disclosed in the following specification and drawing, the method constituting the preferred embodiment of the invention being set forth in the following specification and illustrated by reference to the accompanying drawing, in which Figure 1 is a perspective view of the blanks from which a tapered, steel tube is made, the blanks being formed into shape preparatory to being assembled together.

Fig. 2 is a perspective view showing the two blanks assembled with the brazing material in place ready for the brazing operation.

Fig. 3 is a perspective view of the tapered tube after the brazing operation, portions of the outer tube being illustrated as having been removed to show the manner in which the brazing material flows to unite the entire area of the contiguous surfaces of the two tubes.

Fig. 4 is a perspective view of the completed golf club.

In the present invention, the tubular shaft is designed to be made of a plurality of thicknesses or plies of metal. In the present illustration, the shaft is to be made of two plies and in this case two sheet metal blanks are formed up, preferably of steel, and trimmed to desired shape, depending upon the taper of the tube which is to be formed therefrom. If the tube is to be cylindrical, the blank, of course, would be rectangular, but it is preferred to be made tapered. Each blank is preferably formed of steel of the desired gauge and chemical analysis, depending upon the weight of the shaft which is to be formed, and the degree of flexibility or resilience such shaft is to have. The two blanks are then formed roughly into the shape of the tubular shaft to be made, but with one blank of a little less diameter than the other. The smaller tube, indicated at 10, is then inserted in the outer tube, 11, care being taken at this time to have the seams of the two tubes displaced one from the other circumferentially of the shaft so formed. Preferably, the two seams in a two-ply shaft are located diametrically opposite one another, as this will insure perfect balance in the finished article.

To insure a close fit of the one tube into the other, the larger tube is preferably wound with an asbestos wrapping 12, so that the inner tube may be inserted in the outer tube with a driving fit, without danger of the seam in the outer tube being opened up.

It is, of course, essential that these two plies or thicknesses of metal be securely united one to the other so that there can be no relative movement of the two tubes, when the finished shaft is subjected to any bending or flexing strains. To so unite the two tubes, strips of brazing material, indicated at 13, are inserted between the two tubes, a strip of such material being positioned in registry with each one of the seams in the assembled tubes. The tubes and brazing strips thus assembled, are then inserted in a furnace in an atmosphere of hydrogen, the furnace being maintained at or about the melting point of the brazing material. It has been found that by using two tubes, placed one inside the other, and strips of brazing material at the seams, this brazing material, when rendered molten by the brazing heat, will flow over substantially the entire area of the contiguous surfaces of the two tubes so that the tubes are firmly and securely united one to the other, the two plies making practically a one-piece shaft. Tubes made up as above outlined, have had portions of the outer tubing removed, as indicated at 15, in Fig. 3, and by removing these portions on the finished tube, it has been observed that the brazing material, while originally in strip form, has coursed around the entire circumference or area of the contacting surfaces of the two tubes and united the two tubes together throughout those surfaces.

It will be understood that golf shafts must be made of steel, possessing a sufficiently high carbon content as to take heat treatment for the purposes of hardening and tempering. Preferably, copper or certain alloys of copper, such as an alloy of 93 parts copper and 7% aluminum, or copper and nickel, are used for the brazing material, as these brazing materials have a melting point of approximately 2000°. This melting point is considerably higher than the temperatures that are used for hardening and tempering the shaft, a temperature of approximately 1450° being used in the hardening step, and a temperature of 700° being used for tempering. From this it will be seen that the brazing materials used, will not be affected by the hardening and tempering temperatures.

From the foregoing, it will be seen that while the shaft is made of two or more thicknesses of material, nevertheless a substantially uniform structure is obtained, because the inner tube or tubes may be placed within the surrounding tube or tubes with a driving fit, thereby insuring a very positive close fit by the juxtaposed tubes in the finished shaft. Another feature is that no reinforcing strips are necessary at the seams and as a consequence, a perfect balance may be obtained in the finished article. Again, it will be observed that only the very simplest of operations are required in forming up the tubes and assembling them, and, as a consequence, the present tube, and the method for producing the same entail an exceedingly low cost, an item of extreme importance to the manufacturer.

What I claim is:

1. A method of making plain surfaced, thin walled, multi-ply steel tubular articles which consists in placing a tubular form of sheet steel with the edges of said sheet abutting within a second like form with the abutting edges of one form offset circumferentially from the edges of the other; placing strips of brazing material between said forms with a strip in registry with the abutting edges of each form; and subjecting the assembled forms and strips to heat in an atmosphere of hydrogen sufficient to melt and cause the brazing material to completely cover the contiguous surfaces of the two forms.

2. A method of making plain surfaced, multi-ply steel tubular articles which consists in placing a tubular form of sheet steel with the edges of the sheet abutting within a second like form with the abutting edges of one form offset circumferentially from the edges of the other; placing between said forms, strips of brazing material having a fusing point in excess of the temperature required for tempering and hardening the steel forms, said strips being in registry with said abutting edges; and subjecting said assembled forms and strips to heat in an atmosphere of hydrogen sufficient to melt said strips of brazing material and cause the same to flow over and cover the contiguous surfaces of the two forms.

3. A method of making plain surfaced, tapered, multi-ply steel tubular shafts which consists in wrapping a tapered tubular form of sheet steel with the edges of the sheet abutting, placing a second like form within the first form with a driving fit and with the abutting edges of one form offset circumferentially from the edges of the other; placing strips of brazing material between the two forms in registry with the abutting edges of said forms; and subjecting the assembled forms and strips to heat in an atmosphere of hydrogen sufficient to melt said brazing material and cause the same to cover the contiguous surfaces of the two forms.

HERBERT C. LAGERBLADE.